United States Patent Office 2,847,402

Patented Aug. 12, 1958

2,847,402

HIGH PRESSURE HOMOPOLYMERIZATION AND INTERPOLYMERIZATION OF VINYLENE CARBONATE

Earl W. Gluesenkamp and John D. Calfee, Dayton, Ohio, assignors to Monsanto Chemical Company, St. Louis, Mo., a corporation of Delaware No Drawing. Application December 5, 1955
Serial No. 550,828

11 Claims. (Cl. 260—77.5)

This invention relates to a new polymerization process. The invention pertains to particular procedures for effecting the homopolymerization of vinylene carbonate, and the interpolymerization of vinylene carbonate with other unsaturated organic compounds copolymerizable therewith and having at least three carbon atoms in the molecule.

In accordance with the present invention in preferred embodiments, vinylene carbonate, either alone or together with other unsaturated organic compounds copolymerizable therewith and having at least three carbon atoms in the molecule, is polymerized at pressures of at least 5,000 pounds per square inch. In certain preferred embodiments, vinylene carbonate is polymerized alone or with said comonomers at pressures of at least 15,000 pounds per square inch, and preferably at pressures within the range of 20,000 to 40,000 pounds per square inch. Some of the embodiments of the invention obtain the copolymerization of vinylene carbonate with styrene, acrylonitrile, methyl methacrylate, vinyl acetate, or other comonomers, at high pressures, viz., at least 5,000 pounds per square inch.

Properties of vinylene carbonate and methods of preparing same are described by Newman and Addor, Jour. Amer. Chem. Soc. 75, 1263, March 5, 1953. Vinylene carbonate has the structural formula:

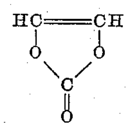

A suitable method of preparing vinylene carbonate is chlorination of ethylene carbonate to form monochloroethylene carbonate, followed by dehydrochlorination of the latter by reaction with an amine, resulting in vinylene carbonate.

Various embodiments of the present invention will realize one or more of the following advantages over polymerizations of vinylene carbonate effected at ordinary pressures: much faster polymerization rate than obtained at ordinary pressures; much smaller quantity of catalyst needed; greater homogeneity of copolymers; more flexible copolymers; better compatibility of copolymers of vinylene carbonate with other polymeric materials; tougher polymers due to increased molecular weight; polymerization can be conducted at appreciably lower temperatures; polymerization can be carried to higher conversion.

The words "copolymerization" and "interpolymerization" (and "copolymer" and "interpolymer") are used synonymously in the present application and are inclusive of the preparation of polymers (and polymers prepared) from vinylene carbonate admixed with a single comonomer, or admixed with two or more comonomers.

The essence of the present invention lies in the employment of high pressures for the homopolymerization of vinylene carbonate, and for the interpolymerization of vinylene carbonate with one or more other unsaturated organic compounds copolymerizable therewith and having at least three carbon atoms in the molecule. While some advantages are obtained at pressures of from 1,000 to 5,000 pounds per square inch, the pressure should be at least 5,000 pounds per square inch for best results. Pressures of at least 15,000 pounds per square inch are more preferably employed. Often optimum results are obtained at pressures within the range of 20,000 to 40,000 pounds per square inch. There is no particular upper pressure limit except that imposed by equipment limitations and pressures up to 200,000 pounds per square inch and even higher are suitable. It will be understood that suitable precautions should be observed in effecting this polymerization process, including the use of rupture disks, barriers, and other well-known means for carrying out high pressure reactions with safety. It is possible to have a combination of reaction conditions resulting in an explosive reaction, and this should be guarded against by known means. However, technical facilities for the commercial use of high pressures have been adequately developed, and therefore the high pressures employed in the present invention are no barriers to the commercial use of the process.

The polymerization can be carried out at temperatures within a fairly broad range, which is preferably 35° C. to 125° C. The higher temperatures tend to result in a discolored product, probably by decomposition of vinylene carbonate and/or vinylene carbonate units in the polymer molecule. However, in equipment and at conditions adapted for obtaining rapid polymerization and satisfactory heat removal, tolerance towards high temperatures is considerably improved. In any event, a temperature sufficiently high within the operative range should be used to give a reasonable reaction rate. The preferred range is 50° C. to 100° C.

As used herein, the term "polymer" is to be taken broadly as meaning homopolymers of vinylene carbonate, interpolymers or copolymers of vinylene carbonate with other monomers copolymerizable therewith including as essential ingredients at least one other unsaturated organic compound copolymerizable therewith and having three or more carbon atoms in the molecule, and telomers of vinylene carbonate and of vinylene carbonate plus such other monomers. In one embodiment of the invention, vinylene carbonate is subjected at high pressures to homopolymerization, i. e., the sole polymerizable monomeric material present is vinylene carbonate, and the resulting polymer contains only units of vinylene carbonate. We have found that vinylene carbonate is extremely sluggish in its polymerizing activity, and polymerizing same at ordinary polymerization conditions is not practical. In contrast, our use of high pressures permits comparatively rapid polymerization, good yields, and gives high molecular weight polymer. In other embodiments of the invention, vinylene carbonate is subjected at high pressures to polymerization in the presence of one or more other monomers (termed interpolymerization or copolymerization), said other monomers being as described herein, resulting in polymeric products containing units not only of vinylene carbonate but also of said one or more other monomers in the polymer. The products of polymerizing mixed monomers may be largely or entirely true copolymers wherein a single molecule is built up of units of each monomer, or may sometimes contain appreciable quantities of mixed homopolymers. As in the case of the homopolymerization of vinylene carbonate at high pressures, the copolymerizations permit more rapid polymerization to occur, better yields, and high molecular weight products. Additionally, the copolymer products are much more self-compatible, i. e., homogeneous, than when copolymerization is attempted at ordinary conditions. Such ordinary conditions in many instances are completely ineffective to produce any copolymerization. Any of the polymers of vinylene carbonate described herein, whether homopolymers, interpolymers or telomers, can have part or all of the vinylene carbonate units therein hydrolyzed to corresponding hydroxyl-containing units.

The process of this invention is of generic application to the high pressure homopolymerization of vinylene carbonate, and to the copolymerization under high pressures, of vinylene carbonate with one or more polymerizable compounds having the non-aromatic

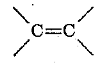

group and having at least three carbon atoms in the molecule. Thus, it is applicable to copolymerization of vinylene carbonate with monomeric unsaturated polymerizable compounds having at least three carbon atoms in the molecule and in which the unsaturation is due to a single terminal ethylenic group which is attached to a negative radical. It is thus applicable to copolymerization of vinylene carbonate with vinylidene compounds in general, including vinyl compounds, which have at least three carbon atoms in the molecule. It is thus applicable to copolymerization of vinylene carbonate with acrylyl and alkacrylyl compounds. It is applicable to copolymerization with compounds having a single polymerizable non-terminal ethylenic group. Furthermore, it is applicable to copolymerization with polymerizable compounds having a plurality of ethylenic linkages of aliphatic character whether conjugated or isolated. A particularly preferred class of comonomers to be copolymerized with vinylene carbonate in accordance with the invention, is that of polymerizable unsaturated compounds having at least three carbon atoms in the molecule and wherein the carbon-to-carbon unsaturation consists in a terminal methylene, i. e., $CH_2$, joined by an ethylenic double bond to its neighboring carbon, i e., consists in a

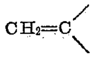

group.

Compounds having a terminal methylene group which are subject to copolymerization with vinylene carbonate at high pressures by the process of this invention include those having one ethylenic unsaturation such as olefin hydrocarbons, e. g., propylene, isobutylene, butene-1, cis-butene-2, trans-butene-2, pentene-1, etc.; acrylyl, and alkacrylyl compounds, e. g., acrylic, haloacrylic, methacrylic, ethacrylic, etc., acids, esters, nitriles and amides—for example acrylonitrile, methyl methacrylate, methyl ethacrylate, ethyl methacrylate, butyl methacrylate, octyl methacrylate, cyclohexyl methacrylate, all alkyl acrylates and methacrylates containing up to 10 carbon atoms in the alkyl group, methoxymethyl methacrylate, n-butoxyethyl methacrylate, n-butoxyethoxyethyl methacrylate, aminoalkyl methacrylates, such as β-diethylaminoethyl methacrylate, chloroethyl methacrylate, methacrylic acid, methacrylamide, ethyl acrylate, and α-chloroacrylic acid; vinyl carboxylates, e. g., vinyl acetate, vinyl trimethylacetate, vinyl hexanoate, vinyl laurate, vinyl chloroacetate, vinyl propionate, vinyl benzoate, and vinyl stearate; N-vinyl imides, e. g., N-vinylphthalimide and N-vinylsuccinimide; N-vinyl lactams, e. g., N-vinylcaprolactam and N-vinyl butyrolactam; vinyl aryls, e g., styrene, α-methylstyrene, nuclearly substituted methylstyrenes, chlorostyrenes, and vinylnaphthalene; and other vinyl derivatives such as methyl vinyl ketone, vinylpyridine, 2-methyl-5-vinylpyridine, 2-vinylthiophene, vinylpyrrolidone, vinylcarbazole, vinyl isobutyl ether, and vinyl ethyl ether.

Specific examples of copolymers obtained when the process of this invention is employed with mixtures of vinylene carbonate with other ethylenically unsaturated compounds include vinylene carbonate/isobutylene, vinylene carbonate/acrylonitrile, vinylene carbonate/acrylonitrile/vinylpyridines particularly those containing 2 to 10 percent of the vinylpyridine, vinylene carbonate/isobutylene/vinylidene chloride, vinylene carbonate/vinyl acetate, vinylene carbonate/vinyl acetate/allylidene diacetate, vinylene carbonate/vinyl methyl ether, vinylene carbonate/monovinylacetylene, vinylene carbonate/methylacetylene, vinylene carbonate/methyl methacrylate, vinylene carbonate/vinyl acetate/ethylene, vinylene carbonate/monovinylacetylene/methyl methacrylate, vinylene carbonate/styrene, vinylene carbonate/methacrylic acid, vinylene carbonate/sytrene/acrylic acid, vinylene carbonate/vinyl xylene/vinyltoluene, vinylene carbonate/ethylene glycol dimethacrylate.

Polymerizable compounds that have a plurality of ethylenic double bonds that may be copolymerized with vinylene carbonate at high pressures include those having conjugated double bonds such as butadiene, 2-chlorobutadiene, 2-fluorobutadiene, 2-phenoxybutadiene, and isoprene, and compounds containing two or more ethylenic double bonds which are isolated with respect to each other. Compounds of the latter type include those having two or more ethylenic groups conjugated with a carboxylic group, e. g., methacrylic anhydride, acrylic and substituted acrylic esters of polyhydric alcohols. Compounds having one ethylenic group conjugated with a carboxylic group that may be employed include diallyl maleate, vinyl methacrylate, allyl methacrylate, crotyl methacrylate, methallyl methacrylate and compounds which have no conjugation of the polymerizable ethylenic groups with carboxylic groups, including diallyl phthalate, diallyl carbonate, diallyl adipate, diallyl fumarate, divinyl succinate, divinyl adipate, and divinylbenzene.

While for the most part compounds which have a terminal methylene are preferred as comonomers with vinylene carbonate, other compounds which are polymerizable include the fumaric esters. Fumaric and maleic acid derivatives are particularly valuable in the preparation of copolymers with vinylene carbonate. Thus, maleic anhydride and dialkyl esters of fumaric and maleic acids, e. g., diethyl and dimethyl fumarate and maleate, may be copolymerized with vinylene carbonate by the process of this invention, and interpolymers of same can be made by the additional inclusion of other monomers, e. g., ethylene, vinyl chloride or styrene. Carbon monoxide, sulfur dioxide, acetylenic compounds including acetylene itself, are likewise copolymerizable with vinylene carbonate by the process of this invention.

Those skilled in the art will appreciate that the comonomers and classes of comonomers just named are not the only ones which can be copolymerized with vinylene carbonate in accordance with this invention. Broadly, any material having at least three carbon atoms in the molecule and capable of reacting with vinylene carbonate at high pressures to enter into the formation of a polymer molecule containing both vinylene carbonate units and units of said material, can be used as a comonomer. The two preferred requirements are that a compound to be copolymerized with vinylene carbonate in accordance with this invention be (*a*) ethylenically unsaturated, and (*b*) copolymerizable with vinylene carbonate, since factors such as stearic hindrance occasionally prevent a

group from copolymerizing in a particular molecule. It is also to be understood that all monomers included in the foregoing are by no means equivalent one to the other, for amongst the large variety of monomers great differences are found in ease of copolymerization and the character of product obtainable. Comonomers containing not over 30 carbon atoms per molecule are generally most useful.

The invention encompasses the copolymerization of vinylene carbonate with comonomers of the type described herein, in all proportions. Most copolymers will contain from 5 to 95 weight percent vinylene carbonate and from 95 to 5 weight percent of one or more other unsaturated organic compounds copolymerizable therewith and having at least three carbon atoms in the molecule, based on the combined weights of the monomers entering into the copolymer. In its broadest aspects the invention contemplates the production of polymers of vinylene carbonate containing the smallest significant quantity of any one or more of the comonomers mentioned herein or other materials copolymerizable with vinylene carbonate, which may be 1 weight percent or less, and at the other extreme the production of polymers of such comonomers containing the smallest signification quantity of vinylene carbonate, which may be 1 weight percent or less, and all proportions between those extremes. It will be clear that vinylene carbonate can be copolymerized, in accordance with this invention, with one, two, three or more different comonomers in a single polymerization to provide interpolymers containing vinylene carbonate units plus units of one or more comonomers.

Amongst the copolymers of the invention are those containing a major proportion of vinylene carbonate by weight and a minor proportion of a comonomer, usually in comparatively small amount to modify somewhat the character of the polymer which, however, will still retain many of the characteristics of vinylene carbonate homopolymer. Such modifications permit variations in properties such as solubility in given solvents, molecular weight, surface active properties of hydrolyzed copolymers, and the like. For many purposes, however, the most useful copolymers are those wherein the vinylene carbonate constitutes a minor percentage by weight of the copolymer, often 25 percent or less by weight, giving products which retain many of the characteristics of the homopolymer of the particular comonomer (or comonomers) employed. Such use of minor amounts of vinylene carbonate in a copolymer generally will increase the flexibility of the polymer, the greater the percentage of vinylene carbonate the greater the flexibility, and this of course is very useful in many applications. Such copolymers are much more self-compatible, i. e., homogeneous, than if their production is attempted at ordinary pressures. They also exhibit increased compatibility towards other polymeric materials, including natural and synthetic resins and elastomers. The use of minor amounts of vinylene carbonate in the interpolymers also permits the introduction of chosen percentages of hydrolyzable vinylene carbonate units, which can be partially or completely hydrolyzed to give the corresponding

units in the molecule which increases the affinity of the polymer toward water and various oxygenated organic solvents such as alcohols, ketones, and the like. Further, the vinylene carbonate units can be reacted directly, or usually after hydrolysis to hydroxyl-containing units, with a variety of reagents to add other functional groups to the polymer molecule and/or to cross link polymer molecules.

Polymers and copolymers of vinylene carbonate produced in accordance with the present invention are inclusive of modified polymeric products known as telomers, obtained by carrying out the polymerization in the presence of materials which are non-polymerizable under the conditions employed but which combine with a plurality of units of the monomers. The products obtained by such a telomerization or chain-transfer reaction may be represented by the formula $Y(A)_nZ$ wherein A is a divalent radical formed from a monomeric material comprising vinylene carbonate and containing vinylene carbonate units and also comonomer units when a comonomer is used, $n$ is an integer of 2 to 50 or even higher, and Y and Z are fragments terminally attached to a chain of monomer units, which fragments together form a molecule of the non-polymerizable compounds such as halogenated compounds, e. g., carbon tetrachloride, acids, e. g., isobutyric acid and anhydride; esters, e. g., methyl propionate; acetals, e. g., dioxolane, mercaptans, bisulfites, alcohols, ethers, silicon halides, hydrogen chloride and similar compounds.

While under some conditions vinylene carbonate may be polymerized or copolymerized at high pressures without the use of an added catalyst, it is much preferred to employ sufficient catalyst to give a reasonable reaction rate. Suitable catalysts include those of the free-radical promoting type, principal among which are peroxide-type polymerization catalysts, and azo-type polymerization catalysts. Those skilled in the art are now fully familiar with a large number of peroxide-type polymerization catalysts and a suitable one can be chosen readily by simple trial. Such catalysts can be inorganic or organic, the latter having the general formula R'OOR'' wherein R' is an organic radical and R'' is an organic radical or hydrogen. These compounds are broadly termed peroxides, and in a more specific sense are hydroperoxides when R'' is hydrogen. R' and R'' can be hydrocarbon radicals or organic radicals substituted with a great variety of substituents. By way of example suitable peroxide-type catalysts include benzoyl peroxide, tertiary butyl peroxide, tertiary butyl hydroperoxide, diacetyl peroxide, diethyl peroxycarbonate, dimethylphenyl hydroperoxymethane (also known as cumene hydroperoxide), among the organic peroxides; hydrogen peroxide, potassium persulfate, perborates and other "per" compounds among the inorganic peroxides. The azo-type polymerization catalysts are also well known to those skilled in the art. These are characterized by the presence in the molecule of the group —N=N—; the dangling valences can be attached to a wide variety of organic radicals, at least one however preferably being attached to a tertiary carbon atom. By way of example of suitable azo-type catalysts can be mentioned $\alpha,\alpha'$-azodiisobutyronitrile, diazoaminobenzene, azobis-(diphenylmethane), and $\alpha,\alpha'$-azobis-$\alpha,\gamma$-dimethylvaleronitrile. The peroxy-type or azo-type polymerization catalyst is used in small but catalytic amounts, which are generally not in excess of 1 percent by weight based on the monomeric material. A suitable quantity is often in the range of 0.001 to 0.5 percent by weight. It will, of course, be understood that one catalyst will not necessarily be the full equivalent of another in all respects.

The polymerization can be effected in the presence of small but catalytic amounts of molecular oxygen. While this can be supplied in the form of air or other gases containing molecular oxygen, it is preferred to use essentially pure oxygen. The quantity will usually be within the range of 10 to 200 parts oxygen per million parts monomeric material, on the weight basis.

The polymerization can also be effected under the influence of ionizing radiation of polymerizing intensity in accordance with the general procedures described and claimed in the copending application of William H. Yanko and John D. Calfee, Serial No. 318,098, filed October 31, 1952. Ionizing radiation that can be employed to effect polymerization at high pressures includes $\alpha$-radiation and $\beta$-radiation, but is preferably electromagnetic radiation of high frequency not deflected by electric or magnetic fields and of great pentrative value, e. g., gamma rays and X-rays. Gamma-radiation arising from a radioactive substance, for example cobalt–60, tantalum–182, potassium–40, etc. is a convenient and preferred source.

A reaction time chosen for a given polymerization or copolymerization of vinylene carbonate will depend among other things, on the percentage conversion desired. High conversions, approaching 100 percent of the monomer or monomers can often be obtained. In many instances it is desired to limit the extent of conversion to a value appreciably less than 50 weight percent of the monomeric material charged, for example from 10 to 30 percent conversion. Of course, any unconverted monomers are recovered from the final reaction mixture and recycled, with purification if necessary, to the polymerization, or utilized as charge stock to another polymerization. Those skilled in the art will, of course, appreciate that reaction time is one variable which is interdependent with other reaction variables, particularly pressure, catalyst, amount of catalyst, purity of monomers, proportions of the monomers, when copolymerization is being effected, the presence or absence of added reaction media, and whether the reaction is a batch or a continuous one. In some instances it may be desired to employ a reaction time of several days, but ordinarily reaction time not in excess of about 24 hours is satisfactory. For batch reactions, reaction times of 1 to 20 hours are usually preferred. For continuous reactions, the reaction times are ordinarily shorter, and they range in a continuous flow system from a few minutes up to a few hours, for example from 1 minute to 5 hours. As pointed out hereinabove, the use of high pressures in the present process enables the use of greatly shortened reaction times as compared with similar polymerizations at ordinary pressures.

The polymerization of vinylene carbonate can be effected in accordance with the present invention in bulk or mass, i. e., in reaction mixtures consisting solely of vinylene carbonate, any catalyst employed, and any comonomer employed. However, the polymerization can also be carried out in the presence of added reaction media, for example gaseous or liquid carrying fluids, e. g., water, or organic liquids which may or may not have a solvent action on the polymeric product, e. g., acetone, benzene, xylene, cyclohexanone, hexane, dioxane, methyl ethyl ketone. The use of added non-reacting fluid reaction media is particularly useful in a continuous flow process. When water is used as an added reaction medium, it is permissible to employ additionally suspending and/or emulsifying agents in small amounts which aid in the suspension or actual emulsification of the monomers and homopolymer or copolymer product in the water. Whether or not such materials are used, vigorous agitation is useful, when employing water as a reaction medium, e. g., as by stirring in a batch reactor, or by use of turbulent flow conditions in a continuous flow polymerization. Liquid reaction media assist in controlling the reaction temperature, since the polymerization is highly exothermic. Suitable proportions of water are, for example from 0.5 to 5 parts by weight per part of monomeric material. If a solvent or a non-solvent liquid organic reaction or carrying medium is to be used, ordinarily at least 1 part by weight, up to 5 or 10 parts, per part of monomeric material will be suitable. Adequate provision should be made for removing the exothermic heat of reaction and thus avoiding too severe a temperature build-up during the polymerization.

The term "monomeric material" as used herein refers to the polymerizable material which is either vinylene carbonate alone, or vinylene carbonate together with copolymerizable monomer or monomers as described herein. The use of the term "monomeric material" does not necessarily imply either the presence or absence of additional materials, such as solvents, non-solvent liquids, catalysts, other polymers in preformed state, suspending agents, fillers, and the like. In other words, such materials can be either present or absent, unless the absence or presence of same is specifically discussed.

Under suitable conditions, vinylene carbonate monomer units in the polymeric material can undergo hydrolysis, resulting in the presence of units of the following type in the polymer:

The extent of hydrolysis may range from only a very small percentage of the vinylene carbonate units in the polymeric material up to essentially complete hydrolysis, depending upon the conditions of treatment. When the polymerization is effected in the presence of water, a limited amount of hydrolysis can be expected to occur, especially if the aqueous medium is acidic or alkaline. Simple polymerization in the presence of water does not appear to effect a great deal of hydrolysis of vinylene carbonate monomer, or vinylene carbonate units in the polymer. Of course, the longer the reaction time the more extensive the hydrolysis that can be expected to occur. It may often be desirable to obtain hydrolysis of vinylene carbonate units in the polymer. The presence of hydroxyl groups in the polymer provides points for further reaction with all sorts of reagents, e. g., aldehydes to produce acetals, and imparts water-sensitivity and often adhesiveness to the polymer. With homopolymer, and where the percentage of vinylene carbonate in a copolymer is sufficiently high, a water-soluble polymer can be made by hydrolysis. The same methods of hydrolysis can be used on the homopolymers and copolymers described herein as are employed in hydrolyzing vinyl acetate polymers to form polyvinyl alcohols. Such methods are numerous and are well known in the art.

The following examples provide details of certain preferred embodiments of the invention. The data are to be taken as exemplary, and the invention in its broadest aspects is not limited to the particular conditions and proportions set forth therein.

*Example 1*

This example illustrates the effect of comparatively high temperatures. Styrene in the amount of 80 grams and vinylene carbonate in the amount of 20 grams were placed in a high pressure shaker autoclave bomb, the bomb cooled in Dry Ice (solid $CO_2$), evacuated, and then heated to 120° C. The bomb was pressured with water to 5,000 pounds per square inch, and increased in 5,000 pound-steps at ½-hour intervals to 25,000 pounds per square inch. At the latter pressure the reaction was too rapid and the pressure therefore was vented to 20,000 pounds. The bomb was maintained at 120° C. and 20,000 pounds per square inch pressure for a total of 25 hours. The temperature was raised to 190° C. for a short time at the finish in order to obtain as complete a polymerization as possible of residual monomer.

Examination of the polymer produced in this manner indicated that the reaction was too rapid, probably resulting in too severe a heat build-up at and near the center of the reaction mass, as some of the polymer in the center section of the bomb contained dark decomposition product mixed therewith.

The product was a rigid, transparent and colorless material suitable for molding and extruding into conventional shapes and solvent casting into clear film.

This same polymerization can be effected without the production of the dark material by operating at slightly milder temperature conditions, such as 90° C. and 20,000 pounds per square inch.

*Examples 2–8*

Each of the following copolymerizations was effected by placing in a collapsible steel tube, 6 to 7 mg. benzoyl peroxide catalyst plus the stated quantities of vinylene carbonate and of the comonomer, then sealing the tube by welding. The sealed tubes were then placed within the pressure bomb and subjected to external pressure of 25,000 pounds per square inch at 70° C. internal temperature for 20 hours. The tubes collapsed so that the internal pressure was equal to the external pressure but remained sealed. At the completion of the polymerization, the tubes were opened and the polymer recovered.

| Ex. No. | Vinylene Carbonate, grams | Comonomer, grams | Copolymer | |
|---|---|---|---|---|
| | | | Yield | Character |
| 2 | 0.6 | Acrylonitrile, 5.4 | Essentially complete. | Clear, very hard, brittle. |
| 3 | 1.2 | Acrylonitrile, 4.8 | do | Clear, hard, considerably more flexible than Ex. 2. |
| 4 | 0.6 | Styrene, 5.4 | do | Crystal clear, flexible. |
| 5 | 0.6 | Vinyl acetate, 5.4 | Complete | Crystal clear, hard but flexible. |
| 6 | 1.2 | Vinyl acetate, 4.8 | do | Crystal clear, softer and more flexible than Ex. 5. |
| 7 | 0.6 | Methyl methacrylate, 5.4 | do | Crystal clear, high surface gloss, hard but flexible. |
| 8 | 1.2 | Methyl methacrylate, 4.8 | do | Clear. Less homogeneous appearance, less even film, more flexible than Ex. 7. |

*Example 9*

By the collapsible tube technique described above in Examples 2–8, vinylene carbonate was homopolymerized. Into the tube was charged 7 mg. benzoyl peroxide catalyst plus 6 ml. vinylene carbonate. The tube was then sealed and subjected to 34,000 pounds per square inch pressure at 80° C. for 16 hours.

A clear, hard, brittle homopolymer of vinylene carbonate was thus produced and recovered in the amount of 4 to 5 grams, representing approximately 75 percent conversion.

In contrast, at the same temperature and time conditions but at atmospheric pressure, and with the same proportion of catalyst to vinylene carbonate, little or no polymer can be obtained, depending upon the purity of the vinylene carbonate used, and any polymer produced is of comparatively low molecular weight compared to that obtained at the high pressure of this example.

*Example 10*

Example 9 was repeated, except that 16 mg. benzoyl peroxide catalyst was used, and the pressure was 36,000 pounds per square inch instead of 34,000. The polymer, of the same character, was obtained in approximately 50 percent yield.

*Example 11*

As in Examples 9 and 10, vinylene carbonate was homopolymerized using 30 mg. di-tert.-butyl peroxide in 6 ml. vinylene carbonate. The pressure was 36,000 pounds per square inch, maintained for 16 hours while the temperature was held at 100° C.

The homopolymer thus produced, in approximately 50 percent conversion, was yellowish indicating slight decomposition at this higher temperature.

Normally solid thermoplastic polymers, including copolymers, of vinylene carbonate made in accordance with the present invention can be subjected to conventional injection molding and compression molding operations, can be cast as films from solvent by known techniques, solutions of the polymer can be extruded into various forms including extrusion in the form of fibers or films into a non-solvent liquid or into a gas effecting evaporation of solvent, or can be extruded in various forms in the absence of any solvent. Such polymers can be worked on mills alone or in admixture with other plastic materials in known manner. Copolymers of vinylene carbonate with other monomers when made at high pressures as described herein will often be found to be much more compatible with other resins and polymeric materials in general than when made at ordinary pressures. Plasticizers, modifiers, fillers, stabilizers, pigments and the like can be incorporated in polymers made in accordance with this invention. It will be appreciated that the characteristics of the numerous polymers and copolymers made under varying polymerization conditions and with varying proportions of vinylene carbonate and comonomers will cover a wide range. Those skilled in the art, having had the benefit of the present disclosure, can choose suitable proportions of vinylene carbonate and comonomers, and suitable polymerization conditions, for producing polymers of desired characteristics. High molecular weight normally solid thermoplastic copolymers are preferred. However, low molecular weight semi-solid or liquid polymers, made by suitable procedures, for example telomerization as described hereinabove, are within the broad scope of the invention.

This application is a continuation-in-part of our copending application, Serial No. 355,860, filed May 18, 1953, now abandoned. It is also related to our copending application, Serial No. 355,859, filed May 18, 1953, wherein vinylene carbonate is copolymerized with ethylene, the ethylene being an essential component of the monomeric mixture and resulting copolymer. It is also related to our copending application, Serial No. 550,827, filed of even date with the present application, wherein vinylene carbonate is copolymerized with a halo-substituted ethylene, said halo-substituted ethylene being an essential component of the monomeric mixture and resulting copolymer.

While the invention has been described with particular reference to various preferred embodiments thereof, it will be appreciated that variations from the details given herein can be effected without departing from the invention in its broadest aspects.

We claim:

1. A process which comprises subjecting a member selected from the group consisting of (*a*) vinylene carbonate alone and (*b*) vinylene carbonate plus a comonomeric material comprising an unsaturated organic compound copolymerizable therewith and having at least three carbon atoms in the molecule, to polymerization at a pressure of at least 5,000 pounds per square inch.

2. A process which comprises subjecting vinylene carbonate to homopolymerization at a pressure of at least 5,000 pounds per square inch and a temperature within the range of 35° C. to 125° C.

3. A process which comprises subjecting vinylene carbonate plus a comonomeric material comprising an unsaturated organic compound copolymerizable therewith and having at least three carbon atoms in the molecule to interpolymerization at a pressure of at least 5,000 pounds per square inch and a temperature within the range of 35° C. to 125° C.

4. A process which comprises subjecting a minor proportion by weight of vinylene carbonate and a major proportion by weight of an unsaturated organic compound copolymerizable therewith and having at least three carbon atoms in the molecule, to interpolymerization at a pressure of at least 5,000 pounds per square inch.

5. A process which comprises subjecting a member selected from the group consisting of (*a*) vinylene carbonate alone and (*b*) vinylene carbonate plus a comonomeric material comprising an unsaturated organic compound copolymerizable therewith and having at least three carbon atoms in the molecule, to polymerization at a pressure within the range of 20,000 to 40,000 pounds per square inch.

6. The copolymerization of vinylene carbonate with styrene at pressures of at least 5,000 pounds per square inch.

7. The copolymerization of vinylene carbonate with acrylonitrile at pressures of at least 5,000 pounds per square inch.

8. The copolymerization of vinylene carbonate with vinyl acetate at pressures of at least 5,000 pounds per square inch.

9. The copolymerization of vinylene carbonate with an alkyl methacrylate having up to 10 carbon atoms in the alkyl group at pressures of at least 5,000 pounds per square inch.

10. The copolymerization of vinylene carbonate with methyl methacrylate at pressures of at least 5,000 pounds per square inch.

11. A process which comprises subjecting a monomeric material comprising a compound selected from the group consisting of styrene, acrylonitrile, vinyl acetate and methyl methacrylate and up to 25 weight percent, based on total monomeric material, of vinylene carbonate, to interpolymerization at a pressure within the range of 20,000 to 40,000 pounds per square inch.

References Cited in the file of this patent

UNITED STATES PATENTS

| | | |
|---|---|---|
| 2,563,771 | Adelson | Aug. 7, 1951 |
| 2,722,525 | Price et al. | Nov. 1, 1955 |
| 2,733,228 | Salyer et al. | Jan. 31, 1956 |